No. 762,978. PATENTED JUNE 21, 1904.
J. BAESSLER.
DIPPING FRAME FOR CHOCOLATE CREAM EGGS.
APPLICATION FILED FEB. 19, 1904.
NO MODEL. 2 SHEETS—SHEET 1.

Witnesses
H. W. Bormann
Robt. J. Mueller

Inventor:
Jacob Baessler
By Hermann Bormann
Att'y.

No. 762,978. PATENTED JUNE 21, 1904.
J. BAESSLER.
DIPPING FRAME FOR CHOCOLATE CREAM EGGS.
APPLICATION FILED FEB. 19, 1904.
NO MODEL. 2 SHEETS—SHEET 2.
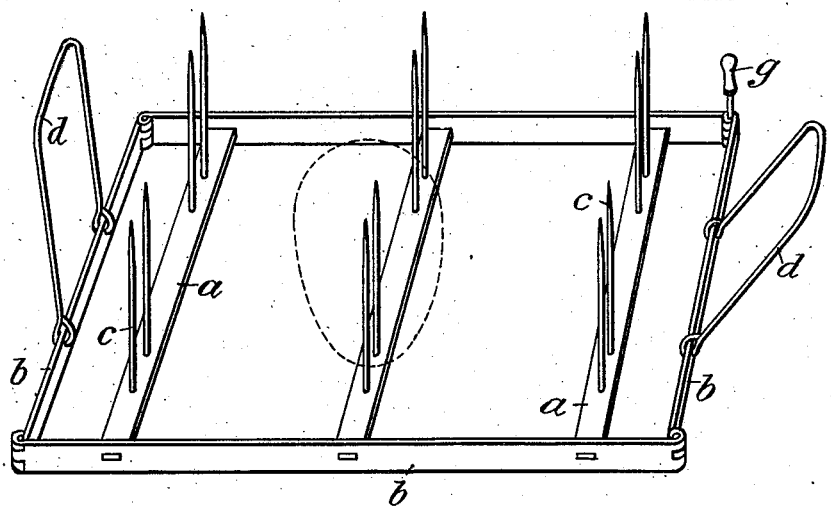
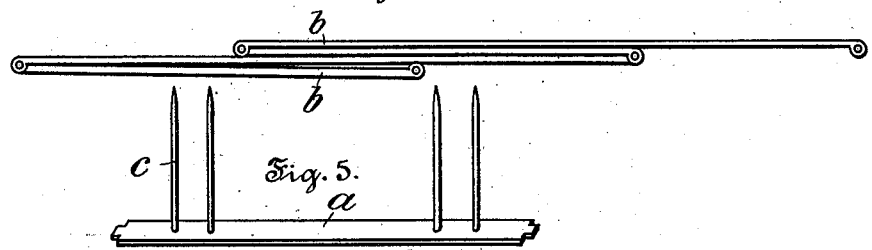
Witnesses.
H. W. Bormann
Robt. G. Mueller
Inventor:
Jacob Baessler
By Hermann Bormann
Att'y.

No. 762,978. Patented June 21, 1904.

UNITED STATES PATENT OFFICE.

JACOB BAESSLER, OF PHILADELPHIA, PENNSYLVANIA.

DIPPING-FRAME FOR CHOCOLATE-CREAM EGGS.

SPECIFICATION forming part of Letters Patent No. 762,978, dated June 21, 1904.

Application filed February 19, 1904. Serial No. 194,427. (No model.)

*To all whom it may concern:*

Be it known that I, JACOB BAESSLER, a citizen of the United States, residing at Philadelphia, in the county of Philadelphia and State of Pennsylvania, have invented a new and useful Dipping-Frame for Chocolate-Cream Eggs, of which the following is a specification.

My invention relates to devices for coating bonbons or other pieces of confect, and more particularly to such as are designed for coating cream eggs by dipping them into liquid chocolate. Heretofore such eggs were either coated by hand singly or put onto pins extending from a board or other solid backing, and this was then inverted, so that the eggs were held to the pins by the mere friction between the said pin and the material of the egg surrounding the pin. Since all these pins taper, it is clear that the eggs are liable to slide therefrom either through their own weight or some other cause. To entirely overcome this difficulty or disadvantage, I have provided a frame with pins, onto which the cream eggs to be coated are fixed, and the frame, with eggs, is then immersed in liquid chocolate without inverting the frame, and thereby avoiding the liability of the sliding off of the eggs from their respective pins. To obtain this result, I provide an open frame composed of bars, which latter are hinged or otherwise held together to form a foldable frame.

My invention will be more fully understood taken in connection with the accompanying drawings, forming part hereof, and in which—

Figure 1:
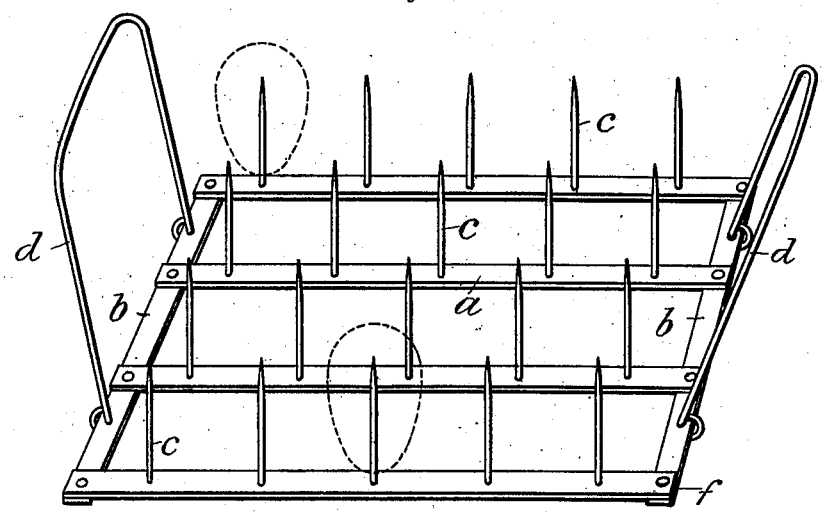
Figure 2:

Figure 1 is a perspective view of a dipping-frame having the bars hinged, showing the pins for receiving the eggs to be coated and handles for manipulating the frame. Fig. 2 is a top view of the frame shown in Fig. 1 when folded together. Fig. 3 is a perspective view of a frame in which the outside bars are hinged together and the pin-carrying slats are removably held between said bars. Fig. 4 is a top view of the hinged outside bars of the frame shown in Fig. 3, and Fig. 5 is a perspective view of the pin-carrying slat of the frame shown in Fig. 3.

Referring now to the drawings for a further description of my invention, and more particularly to Figs. 1 and 2, $a$ represents the slats or bars into which the pins $c$ for holding the eggs in position are secured. $b$ represents side bars having holes for attachment of the handles $d$. The slats $a$ and bars $b$ are pinned together, so that the frame, composed of the pin-carrying slats $a$ and side bars $b$, may be folded together, as shown in Fig. 2, for the purpose of storing the frames away when not in use. The handles $d$ may be easily unhooked when folding the frame.

In Figs. 3, 4, and 5 I have shown a modified form of frame in which the outside bars $b$ are hinged together at the corners of the frame, the hinge on one corner being provided with a removable pin $g$, so that the pin-carrying slats $a$, which are tenoned into the bars $b$, may be easily removed and the outside bars folded up, as shown in Fig. 4, for storing, the handles $d$ for this purpose being detached from the bars $b$.

When using my improved dipping-frame, a cream egg or other confect is pierced onto each of the pins $c$, as shown in Fig. 1; but when heavy or bulky eggs are to be treated use is made of two pins, as shown in Figs. 3 and 5. The two pins when attaching the egg are slightly pressed toward each other, so that a certain tension is produced within the material of the egg, and the friction between the pins and the egg material is increased. After the eggs are in position on the pins $c$ of a frame the whole frame, with eggs, is dipped into liquid chocolate or other substances by means of the handles $d$.

Having thus described the nature and objects of my invention, what I claim as new, and desire to obtain by Letters Patent of the United States, is—

A dipping-frame composed of bars adapted to be folded together, pins in said bars and handles for manipulating said frame substantially as and for the purposes set forth.

In witness whereof I have hereunto set my hand in the presence of two subscribing witnesses.

JACOB BAESSLER.

Witnesses:
HERVEY J. SHERER,
HERMANN BORMANN.